(12) United States Patent
Lockwood (10) Patent No.: US 9,657,495 B2
(45) Date of Patent: May 23, 2017

(54) CRANE SYSTEM INCORPORATED INTO A TOWER

(71) Applicant: James D. Lockwood, Boulder, CO (US)

(72) Inventor: James D. Lockwood, Boulder, CO (US)

( * ) Notice: Subject to any disclaimer, the term of this patent is extended or adjusted under 35 U.S.C. 154(b) by 0 days.

(21) Appl. No.: 14/883,426

(22) Filed: Oct. 14, 2015

(65) Prior Publication Data

US 2017/0107736 A1   Apr. 20, 2017

(51) Int. Cl.
*E04G 21/00* (2006.01)
*E04H 12/34* (2006.01)
*B66C 23/28* (2006.01)

(52) U.S. Cl.
CPC ........... *E04H 12/342* (2013.01); *B66C 23/28* (2013.01)

(58) Field of Classification Search
None
See application file for complete search history.

(56) References Cited

U.S. PATENT DOCUMENTS

| | | | | |
|---|---|---|---|---|
| 3,628,223 A * | 12/1971 | Babee | ............... | E04G 11/28 249/20 |
| 3,714,304 A * | 1/1973 | Carner | ............... | B28B 7/22 264/219 |
| 3,789,565 A * | 2/1974 | Lindholm | ............... | E04H 12/34 212/176 |
| 4,633,641 A * | 1/1987 | Heinbuchner | ............... | E04B 1/3483 52/745.03 |
| 5,182,458 A * | 1/1993 | McConachy | ............... | F03D 1/00 290/44 |
| 5,645,395 A * | 7/1997 | Huang | ............... | B66C 19/00 212/199 |
| 6,408,575 B1 * | 6/2002 | Yoshida | ............... | E04H 12/34 52/123.1 |
| 6,446,408 B1 * | 9/2002 | Gordin | ............... | E04H 12/182 52/632 |
| 6,614,125 B2 * | 9/2003 | Willis | ............... | F03D 1/001 290/45 |
| 6,868,646 B1 * | 3/2005 | Perina | ............... | E04H 12/34 52/745.17 |
| 7,367,461 B2 * | 5/2008 | Waisanen | ............... | B66C 9/00 212/175 |
| 7,877,934 B2 * | 2/2011 | Livingston | ............... | B66C 23/06 52/296 |
| 8,701,579 B2 * | 4/2014 | Roodenburg | ............... | B63B 35/003 114/61.1 |
| 2003/0183594 A1 * | 10/2003 | Torres Martinez | ... | B66C 23/207 212/196 |
| 2008/0040983 A1 * | 2/2008 | Fernandez Gomez | . | E04H 12/12 52/40 |
| 2008/0078128 A1 * | 4/2008 | Livingston | ............... | F03D 1/001 52/40 |
| 2009/0031639 A1 * | 2/2009 | Cortina/Cordero | ..... | E04H 12/12 52/40 |
| 2009/0107062 A1 * | 4/2009 | Pedersen | ............... | B66C 1/108 52/223.13 |
| 2010/0101086 A1 * | 4/2010 | Amram | ............... | B66C 23/207 29/889.1 |

(Continued)

*Primary Examiner* — Patrick Maestri
(74) *Attorney, Agent, or Firm* — Holland & Hart LLP (57) ABSTRACT

A crane system includes a structural truss positioned within a central opening defined by an inside surface of an annular tower, a crane mast connected to an outside surface of the annular tower, and a jib arm connected to the crane mast.

12 Claims, 12 Drawing Sheets

(56) References Cited

U.S. PATENT DOCUMENTS

| | | | | |
|---|---|---|---|---|
| 2010/0139181 A1* | 6/2010 | Cortina-Cordero | ..... | E04H 12/16 52/125.2 |
| 2010/0162652 A1* | 7/2010 | Croes | .................... | E04H 12/085 52/651.01 |
| 2010/0170188 A1* | 7/2010 | Zilmer | .................... | B66C 23/18 52/745.17 |
| 2011/0067353 A1* | 3/2011 | Tadayon | ................. | F03D 1/001 52/745.18 |
| 2012/0076663 A1* | 3/2012 | From | ...................... | F03D 1/001 416/244 R |
| 2012/0131880 A1* | 5/2012 | Delago | .................. | F03D 1/001 52/745.18 |
| 2013/0081337 A1* | 4/2013 | Zavitz | ................... | E04H 12/344 52/123.1 |
| 2013/0205711 A1* | 8/2013 | Heltoft | ................... | F03D 1/001 52/745.17 |
| 2013/0223964 A1* | 8/2013 | Zheng | .................... | E04H 12/34 414/560 |
| 2014/0083097 A1* | 3/2014 | Montresor | ............ | E04H 12/342 60/641.11 |
| 2014/0102039 A1* | 4/2014 | Wagner | .................. | F03D 1/001 52/745.18 |
| 2014/0175038 A1* | 6/2014 | Arlaban Gabeiras | ... | E04H 12/00 212/195 |
| 2014/0248090 A1* | 9/2014 | Fernandez Gomez | ................... | E02B 17/025 405/196 |
| 2014/0311085 A1* | 10/2014 | Fernandez Gomez | . | F03D 11/04 52/745.18 |
| 2015/0048043 A1* | 2/2015 | Laurens | ................ | B66C 23/207 212/179 |
| 2015/0167342 A1* | 6/2015 | Montaner Fraguet | .. | B66C 23/32 52/745.18 |
| 2015/0285225 A1* | 10/2015 | Ollgaard | ............... | E04H 12/085 52/105 |

\* cited by examiner

CRANE SYSTEM INCORPORATED INTO A TOWER

BACKGROUND

Existing methods of constructing wind towers vary depending on whether the materials are steel or concrete. The decision process used to select whether the tower is to be built out of steel or concrete depends on the geographic location, regional resources, and access to the wind farm site. Steel wind towers are commonly built through bolting steel tubular sections together at intermediate flanges. The heights of steel towers are often limited by the diameter of the steel tubular sections that can be physically transported from the location where the steel pieces are fabricated to the wind farm site without significant modifications to existing roads, bridges, or other physical constraints. These limitations typically result in steel pieces having diameters of up to approximately 20.0 feet. As a result of these diameter limitations, the overall tower height is generally limited when using conventional strength steel. Energy production from a wind tower generally goes up by increasing the height of the tower. Thus, the transportation constraints limit the productivity of the windmill when the tower is made of conventional strength steel.

Advantages of concrete towers include that the concrete sections can be constructed using local materials. As a result, the concrete sections are not transported over long distances and the transportation constraints involved with transporting steel sections are avoided. Cast-in-place construction methods allow for pouring fresh concrete into the forms at any desired height. The drawbacks to cast-in-place methods are reduced construction speed and sensitivity to inclement weather. The common geometry of a concrete wind tower is tapered, which creates complexity in the concrete segment forming system.

One type of foundation for a tower is disclosed in U.S. Patent Publication No. 2014/0202971 issued to Eli Bosco. In this reference, an enhanced stability crane is described. Embodiments include a telescoping main support mast upon which a crane base resides. A boom projects upwardly from the crane base and a jib typically projects upwardly from the boom. A clamping assembly resides on the main support mast and is configured to attach to an existing structure adjacent to the crane, in order to enhance stability. Multiple clamping assemblies can be distributed along the telescoping main support mast when it is extended. The existing structure is generally a tower structure that is columnar and vertical in shape and orientation, and frequently has an elliptical horizontal cross-section. Tower structures are typically, but not necessarily, wind turbine towers. In some embodiments, the crane is mobile capable of lifting objects weighing about 110 tons to a height of about 400 feet. The crane typically adjusts to a collapsed configuration, enabling facile transport. U.S. Patent Publication No. 2014/0202971 is herein incorporated by reference for all that it contains.

SUMMARY

In one aspect of the invention, a crane system includes a structural truss positioned within a central opening defined by an inside surface of an annular tower, a crane mast connected to an outside surface of the annular tower, and a jib arm connected to the crane mast.

In some examples, the crane system includes an annular wall and a lateral opening defined by the wall that extends from the central opening to the outside surface. In this example, the structural truss may be connected to the crane mast through the lateral opening. The structural truss may also include at least two joints in contact with the inside surface of the central opening. In other examples, the structural truss has three or more joints in contact with the inside surface. The structural truss may include a length that is greater than a cross sectional width of the annular tower. This length may be over twenty feet long. In some examples, the crane system includes a lift mechanism that raises the structural truss within the central opening.

In another aspect of the invention, a method for erecting an annular tower includes positioning a structural truss within a central opening of a first annular tower section at a first height and connecting a crane mast positioned on an outside of the first annular tower section to the structural truss through a lateral opening in the first annular tower section.

In some examples, a jib arm is attached to the crane mast. In these examples, the method may further include attaching a second annular tower section to a cable of the jib arm.

The method may further include lifting the second annular tower section to a height above the first annular tower section, positioning the second annular tower section onto the annular tower so that the second annular tower section becomes part of the annular tower, disconnecting the structural truss from the crane mast, raising the structural truss into the second annular tower section, raising the crane mast to the second annular tower section, and connecting the structural truss to the crane mast through a lateral opening in the second annular tower section.

In some examples, the structural truss includes at least three joints in contact with the inside surface. The structural truss may include a length that is greater than a cross sectional width of the annular tower. The length of structural truss may be over twenty feet long.

In some cases, the method may also include moving the structural truss to a second height within the central opening. Further, the method may include lowering the structural truss to a lower height.

In another aspect of the invention, a crane system includes an annular tower, a structural truss positioned within a central opening, and a mast assembly. The annular tower includes an annular wall, a central opening defined with the annular wall, and a lateral opening defined with the wall that extends from the central opening to the outside surface. The structural truss may include at least three joints in contact with the inside surface. The length of the structural truss is greater than a cross sectional width of the annular tower. The length of the structural truss is over twenty feet long. The mast assembly includes a crane mast connected to an outside surface of the annular tower and a jib arm connected to the crane mast. The structural truss is connected to the crane mast through the lateral opening. A lift mechanism raises the structural truss within the central opening.

Any of the aspects of the principles detailed above may be combined with any of the other aspect detailed herein.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

The principles described herein include a crane assembly that can be used to construct a tower. In the windmill construction industry, windmill locations are selected based on their geographic characteristics and legal ability to construct a windmill. Not all locations selected to build a windmill tower are ideal for transporting a crane assembly to and from the construction site. As a result, transporting a crane assembly to a particular construction site can be expensive. Further, the height of transportable cranes may be shorter than desirable in situations where the higher strata in the atmosphere at the windmill's location are more productive. Thus, the transportable cranes may limit the overall height of the windmill tower, which may lead to the windmill being less efficient than it would be if the tower's height was taller.

Cranes are constructed to lift heavy loads. In some cases, the cranes transport the loads to a new elevation. In other examples, the cranes move the loads horizontally from one location to another. Cranes often include a latticed boom that is connected to a jib arm. A cable can be connected to the jib arm, which can be used to hoist the loads. As the cable is used to lift the load, the load's weight is transferred to the jib arm, which applies an asymmetric load to the latticed boom. Consequently, the lattice boom distributes the forces imposed by the asymmetric load so that the latticed boom does not bend or buckle under the asymmetric weight.

In the present invention, a structural truss is placed within at least one annular tower section of an uncompleted annular tower. The structural truss has multiple beams connected at multiple joints which forms a lattice that has multiple joints that are in contact with an inside surface of the annular tower section(s). In some cases, at least one of the structural truss' joints are fastened to the tower section's inside surface. The other joints may be held against the inside surface through compression or another securing mechanism. The structural truss is connected to a mast assembly that is located on the outside of the annular tower section. The structural truss and the mast assembly can be connected through at least one lateral opening in the side of the annular tower sections. A fastener, such as a plate, may be located within the lateral opening and the structural truss may be connected to the plate on a first side, and the mast assembly may be connected to the second side of the plate. The structural truss may have a length that fills the central opening of the uncompleted tower. In some cases, multiple lateral openings may be located in the annular tower section(s) that connect to both the mast assembly and the structural truss. In some cases, just a single lateral opening is used to connect the structural truss and the mast assembly. While the principles herein are described using a plate to connect the structural truss and the mast assembly, any other appropriate type of fastener may be used. For example, the fasteners may be include bolts, screws, rods, clamps, pins, clasps, belts, clips, bands, nails, eyelets, other types of fasteners, or combinations thereof.

The mast assembly may include a mast crane that is connected to a jib arm. A cable may be supported with the jib arm and arranged to lift heavy objects. In some cases, the jib arm can swing independent of the crane mast or pivot independent of the crane mast. In other examples, the crane mast moves with the jib arm. As objects are lifted by the mast assembly, the loads are transferred from the crane mast into the structural truss. As a result, the load is distributed through the truss beams to the joints that are in contact with the inside surface of the annular tower sections. Consequently, the loads are transferred into the tower. The annular tower distributes the uneven loads throughout its structure resulting in the tower supporting the weight of the loads.

The crane assembly can be used to lift additional annular tower sections that can be placed on top of the top most annular section of the uncompleted tower. These additional tower sections can be secured through the annular tower and thereby become part of the annular tower. As the annular tower grows, the mast crane and the structural truss can be used to disconnect from the plate and be moved upwards. The crane mast can be moved up along the outside of the annular tower and be reconnected to another plate in another lateral opening located higher up in the annular tower. Similarly, the structural truss can be moved up within the central opening of the annular tower and be reconnected to the crane mast through the higher lateral opening in the additional annular tower sections. The crane assembly can be used to add even more annular tower sections to the uncompleted annular tower. The process of adding more tower sections and moving the components of the crane assembly can be repeated until tower is completed.

The lateral openings can be precast into the annular tower sections when the annular tower sections are cast. In some examples, the plates or another type of fastener can also be precast into the lateral openings when the annular tower sections are cast. Further, in some examples, no lateral opening is created during the casting process, but a fastener that traverses the thickness of the annular tower section's wall may be cast in place. The fastener in this example is capable of transferring the loads from the crane mast into the structural truss.

One advantage to the principles described herein is that the annular sections of the tower distribute the loads much like the lattice boom of the traditional crane assemblies. These loads are transferred to the tower through the internal structural truss, but the annular tower is the structure that ultimately supports the loads lifted by the crane assembly. With regards to the transportation issues common for conventional crane systems, the structural truss described herein can be significantly smaller than the lattice boom of a traditional crane. Thus, a significantly smaller amount of material has to be transported to the construction site. Also, distributing the payload's weight internally through the tower allows for the weight to be uniformly transferred throughout the annular tower. For example, if the crane mast were merely connected to the side of the annular tower, the payload's weight would be unevenly applied to the side of the annular tower to which the crane mast was attached and would subject the tower to uneven loads. Additionally, the length of the structural truss also provides the benefit of distributing the load over a greater region of the annular tower thereby reducing the potential of concentrating the loads in just a small area, such as just the very top portion of the uncompleted tower. Thus, the principles described herein have the advantage of having the crane mast off to the side to allow placement of additional tower sections while centrally distributing the weight of the crane's payload throughout the annular tower so that the annular tower supports the payload's weight.

For purposes of this disclosure, the term "aligned" means parallel, substantially parallel, or forming an angle of less than 35.0 degrees. Also, for purposes of this disclosure, the term "transverse" means perpendicular, substantially perpendicular, or forming an angle between 55.0 and 125.0 degrees. Further, for purposes of this disclosure, the term "length" refers to the longest dimension of an object. For the purposes of the disclosure, the term "circular" generally means of or relating to a circle. Thus, "circular" may refer to a mathematically defined circle or may refer to a shape that generally relates to a circle but falls outside of the mathematical definition of a circle. So, an object that is "circular" may include at least one flat section, sections with inconsistent radii of curvature, contagious sections that form a slight angle, or have other characteristics that fall outside of a mathematically defined circle, but generally resemble a circle. Further, for the purposes of this disclosure, the term "annular" generally means resembling a ring. An annular object may be circular, triangular, rectangular, polygonal, another shape that has a continuous circumference, or combinations thereof.

Figure 1:
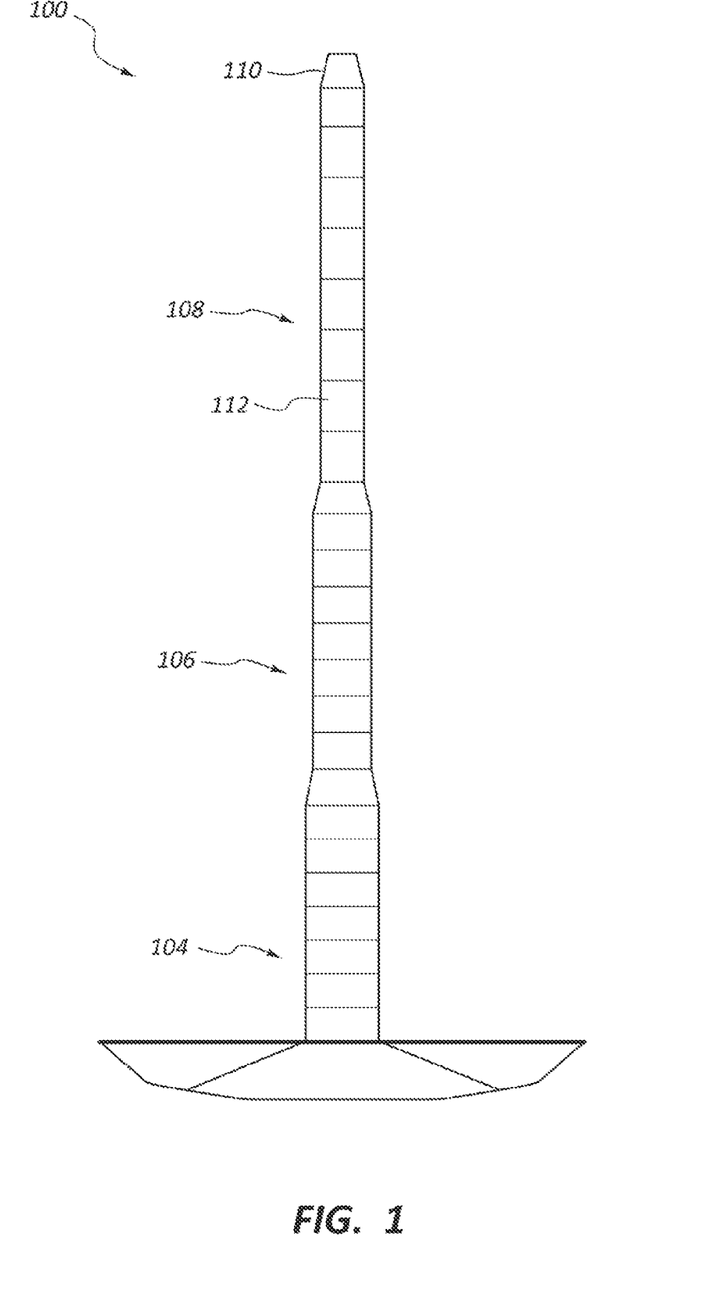
FIG. 1 illustrates a side view of an example of a tower in accordance with the present invention.

Particularly, with reference to the figures, FIG. 1 depicts a cross section of a tower 100. This tower may be a windmill tower or another appropriate type of tower. In the example of FIG. 1, the tower includes a foundation 126, a bottom concrete portion 104, a middle concrete portion 106, a top concrete portion 108, and a tip adapter 110 that connects to the turbine equipment. Each of the bottom concrete portion 104, the middle concrete portion 106, and the top concrete portion 108 are made of concrete annular sections 112. Additionally, each of the bottom concrete portion 104, the middle concrete portion 106, and the top concrete portion 108 collectively have substantially straight walls. Thus, each of the bottom concrete portion 104, the middle concrete portion 106, and the top concrete portion 108 have a common diameter and/or cross section. In the example of FIG. 1, the top concrete portion 108 has a first diameter. The middle concrete portion 106 has a second diameter that may be greater than the first diameter. The bottom concrete portion 104 has a third diameter that may be greater than the second diameter.

The tip adapter 110 may connect to the top most concrete annular section of the tower. The tip adapter 110 may also connect to components that make up the wind turbine (not shown). The wind turbine may be a collection of components that convert the wind's kinetic energy into electric energy. The such components may include rotor blades, a rotor, a drivetrain, a gearbox, a generator, an electrical system, a nacelle, controls, and other types of equipment used to convert the wind's kinetic energy into electric energy.

Figure 2:
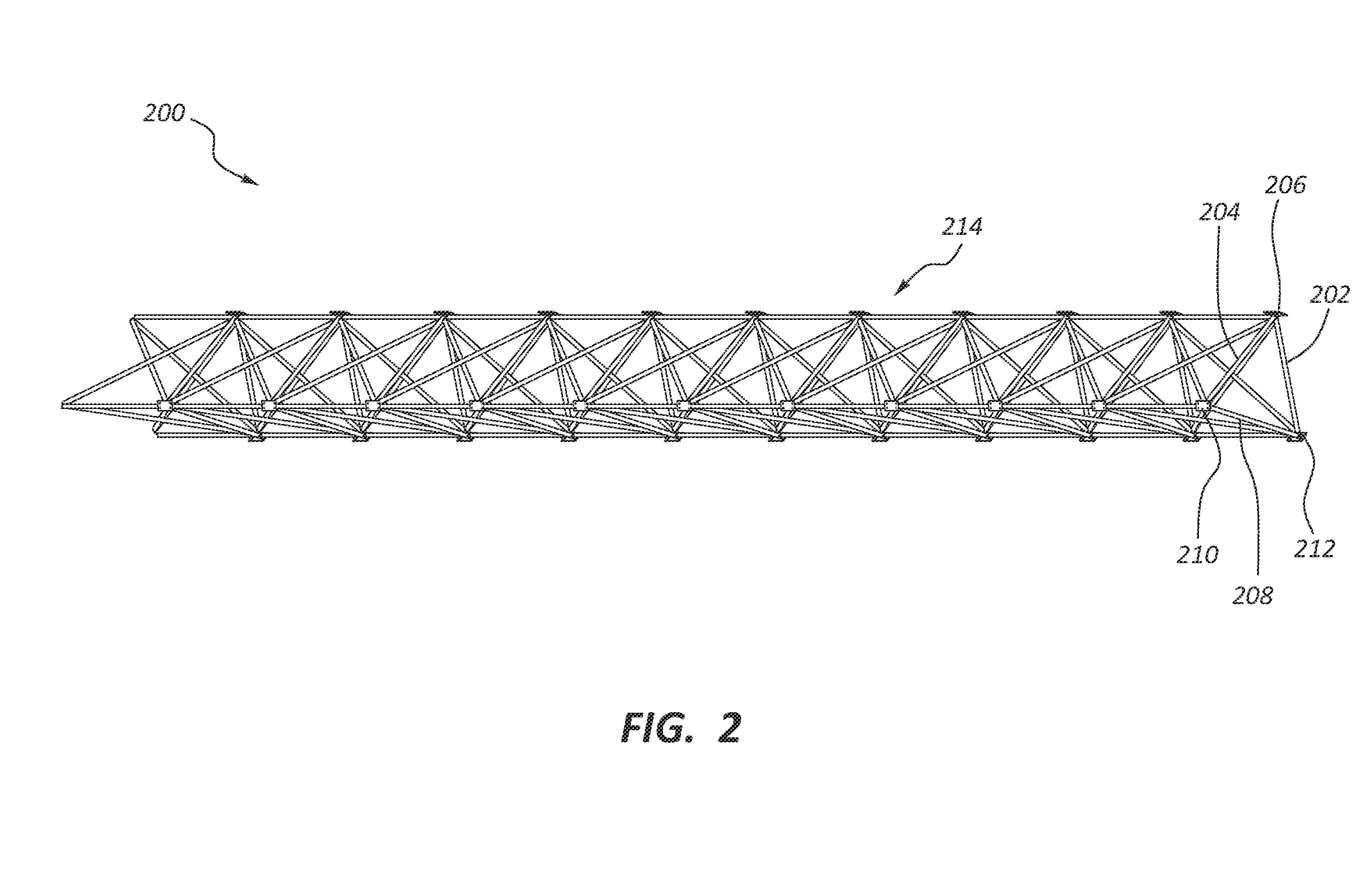
FIG. 2 illustrates a perspective view of an example of a truss in accordance with the present disclosure.

FIG. 2 illustrates an example of a structural truss 200. The structural truss 200 includes a plurality of beams joined together at joints. In this example, the structural truss 200 includes a triangular shape where a first beam 202 and a second beam 204 are joined at a first joint 206. The second beam 204 and a third beam 208 are joined at a second joint 210, and the first beam 202 and the third beam 208 are joined at a third joint 212. In this example, each of the joints 206, 210, 212 are equidistantly spaced from one another.

The structural truss 200 has three dimensional shapes. Additional beams 214 extend away from the joints 206, 210, 212 at orientations transverse the first beam 202, the second beam 204, and the third beam 208, respectively. Each of the transversely oriented beams 214 also connect to additional joints and even more beams. The overall three dimensional shape of the structural truss 200 is a triangular prism. The longitudinal beams of the structural truss 200 form the longitudinal edges of the triangular prism. In other examples, structural truss may be three side, four sided, or have any other appropriate number of sides.

Figure 3:
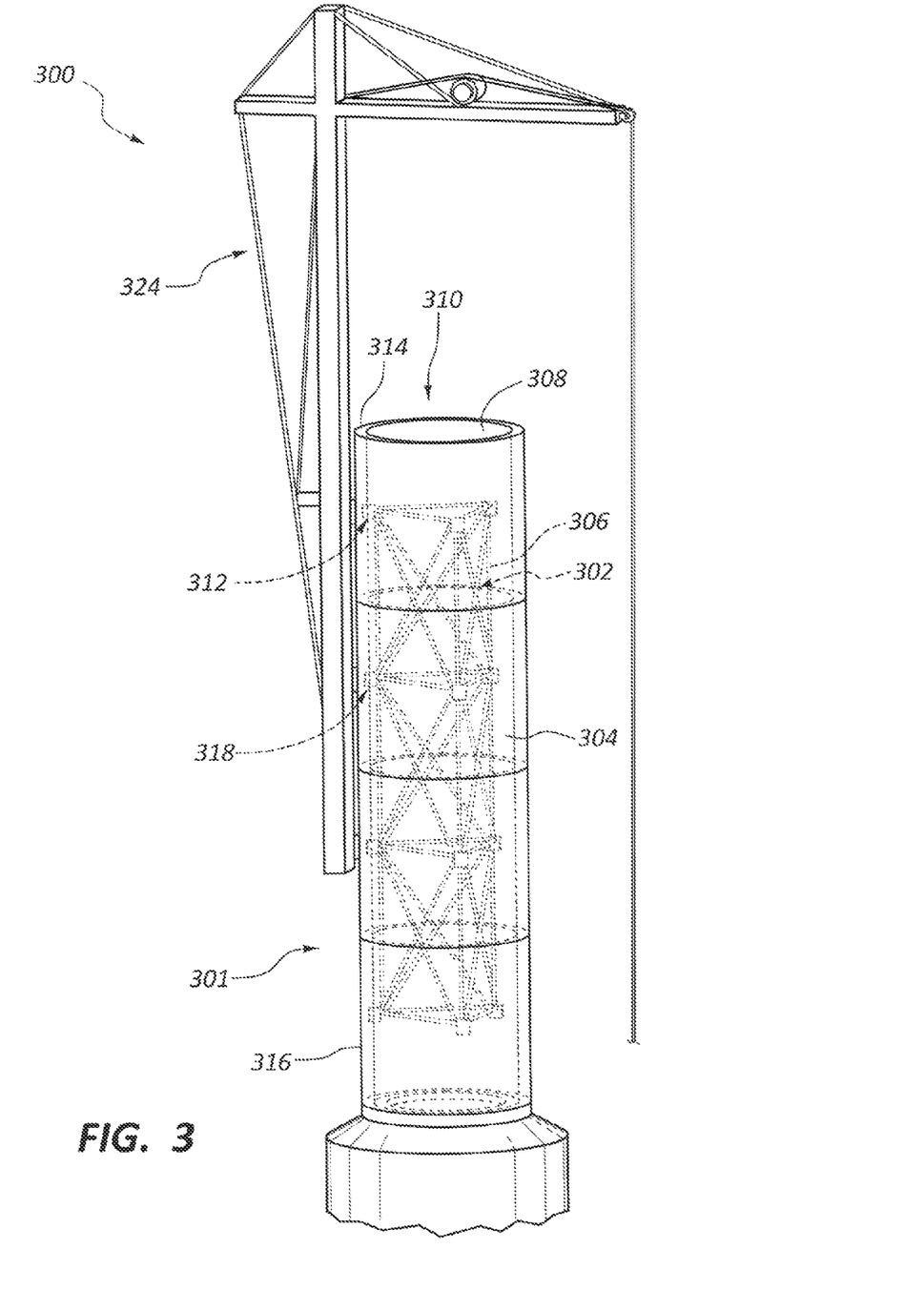
FIG. 3 illustrates a perspective view of an example of a truss in accordance with the present disclosure.

FIG. 3 illustrates an example of the crane assembly 300 incorporated into the annular tower 301. In this example, the structural truss 302 is located within at least one of the annular tower sections 304. The longitudinal beams 306 of the structural truss's triangular prism are in contact with an inside surface 308 of the tower's central opening 310. In this example, the annular tower 301 is under construction, and thus at least some of the annular tower sections 304 are not yet stacked to form the tower 301. In this situation, the crane assembly 300 can be used to lift and position the remaining annular tower sections in the vertical stack of tower sections to complete the tower 301.

At least one of the structural truss's joints is fastened to the annular tower section 304. For example, a lateral opening 312 may be defined in the annular wall 314 of the tower section 304. This lateral opening 312 may extend between the outside surface 316 of the annular tower section 304 and the inside surface 308 of the annular tower section 304. A plate 318 may be secured within the lateral opening 312, and a joint 320 of the structural truss 302 may be fastened to the plate 318 on the plate's inner side. The mast assembly 324 may be secured to the outer side of the plate 318. In some examples, the plate 318 is precast into the lateral opening 312 at the time that the annular tower section 304 was cast. In other examples, the plate 318 was secured within the lateral opening 312 after the annular tower section 304 was cast.

A mast assembly 324 is connected to the outer side of the plate 318. Thus, the loads imposed on the mast assembly 324 when the crane assembly 300 is lifting a payload can be transferred to the structural truss 302 through the lateral opening. With at least some of the joints of the structural truss 302 in contact with the inside surface of the annular tower sections 304, the loads transferred to the structural truss 302 are also transferred into the annular tower sections 304. In some examples, the longitudinal beams of the structural truss are also in contact with the inside surface. In this example, the loads from the crane assembly 300 can be transferred along the length of the structural truss 302, thereby distributing the loads more gradually throughout the annular tower. Thus, the annular tower supports the loads of the crane assembly 300. With the mast assembly 324 attached to the side of the annular tower, the loads from the crane's payload initially impose an unbalanced load onto the annular tower. But, with the mast assembly 324 and the structural truss 302 connected to the same plate 318 in the lateral opening 312, the loads can be centrally distributed throughout the annular tower.

While the illustrated example has been depicted with a lateral opening to connect the mast assembly to the structural truss, any appropriate fastener may be used to connect the structural truss and the mast assembly together. For example, a rod or a series of rods may be cast into the annular tower sections without forming an opening in the annular tower sections. The mast assembly and the structural truss may be connected to the rod or the series of rods on either end. With both the mast assembly and the structural truss connected to the same rods, the weight from the crane's payload may be transferred from outside of the tower to the inside of the tower through the rods. In other examples, plates, beams, rods, or other types of connectors may be cast into the side of the annular tower sections to transfer the crane assembly's loads to the structural truss.

In some examples, each of the outer joints of the structural truss 302 may be in contact with the inside surface 308 of the central opening 310. Thus, each of the joints along the length of the structural truss 302 may be in contact with the inside surface 308. Each of the joints in contact with the inside surface 308 may transfer at least some of the load from the crane into the wall of the annular tower. Thus, the greater the length of the structural truss 302, the more area of the tower that can receive a portion of the load. As a result, the load transfer to the annular tower can be reduced when more joints are in contact with the inside surface 308.

While this example has been described with reference to a structural truss that forms a triangular prism, a structural truss with any appropriate shape may be used. For example, a generally rectangular shaped truss, a generally polygonal shaped truss, or another shaped truss may be used in accordance with the principles described herein.

Figure 4:
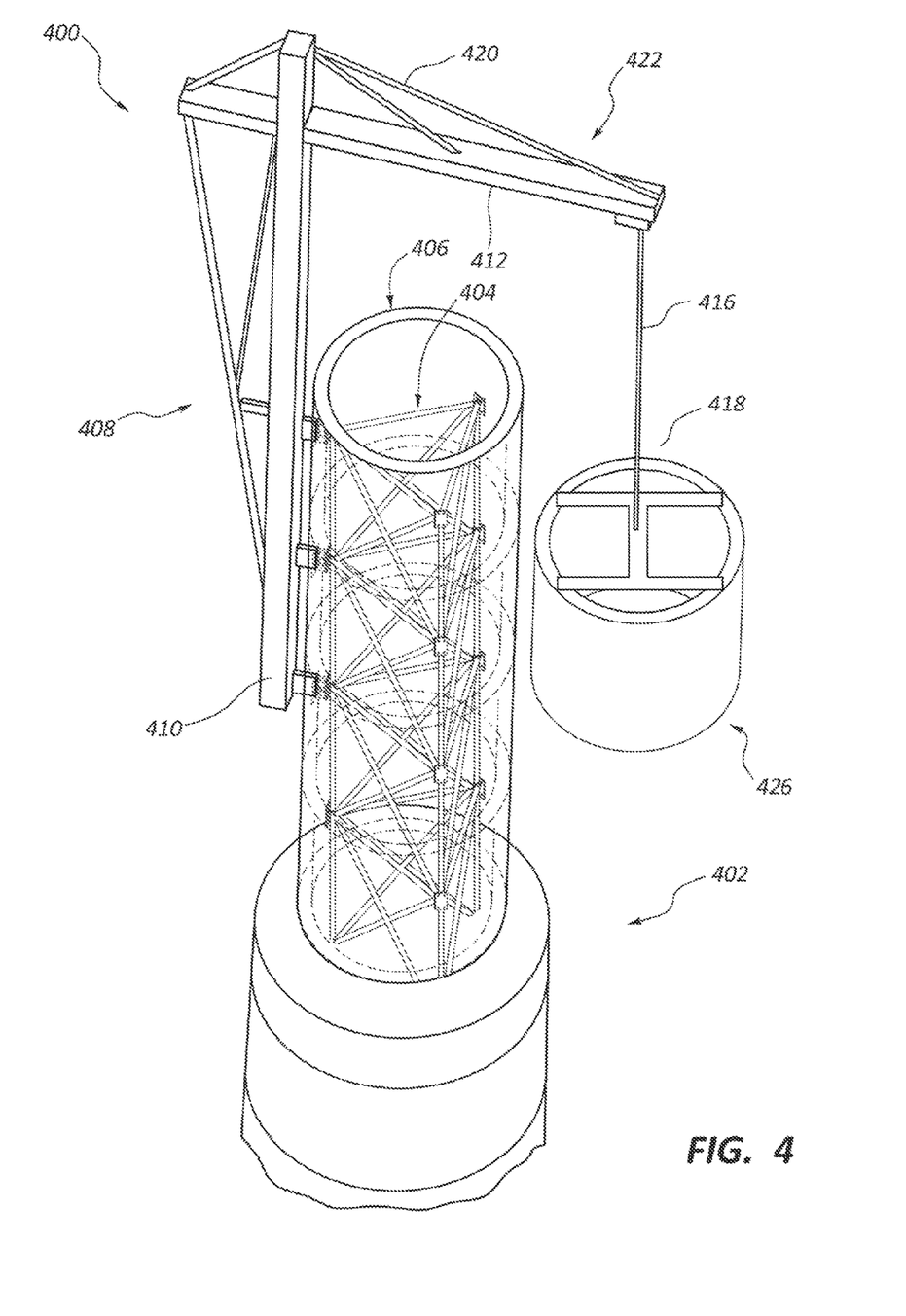
FIG. 4 illustrates a side view of an example of a crane system in accordance with the present disclosure.

FIG. 4 depicts an example of the crane system 400. In this example, the crane system 400 includes an annular tower 402, a structural truss 404 located within a central opening 406 of the annular tower 402, and a mast assembly 408 connected to the outside of the annular tower 402.

The mast assembly 408 includes a crane mast 410 connected to a jib arm 412. At least one trolley is supported by the jib arm 412. A cable 416 or another type of lifting media (e.g. chains, rope, cords, etc.) may control the trolley. A hook 418 or multiple hooks may be connected to the end of the cable. A guy line 420 may be also incorporated into the mast assembly 408 to provide additional support to the cantilevered end 422 of the jib arm 412. The guy line 420 may be a tensioned cable that adds stability to the jib arm's cantilevered end 422.

In some examples, a winch may be incorporated into the crane system 400. The winch may be used to direct the movement of the trolley. The winch may be driven by a motor (not shown). In some cases, the motor is located proximate the winch, while in other examples, the motor is located on the annular tower 402 or at the ground level.

In the illustrated example, an additional annular tower section 426 is connected to the hook 418 of the cable 416 and is in the process of being raised vertically. In some cases, the annular tower sections are cast on site using local materials. The load from the additional annular tower section's weight may be distributed to the annular tower through the connection between the mast assembly 408 and the structural truss 404.

The structural truss 404 may have a length that is longer than the length of the tower sections. In this example, the structural truss 404 may span a first and a second annular sections. As a result, the loads from the mast assembly's payload may be distributed into both of first and second annular section. In other examples, the structural truss 404 may be shorter than the length of just a single annular tower section. In this example, the structural truss 404 may distribute the load into just a single tower section. But, if the structural truss 404 is aligned over the interface between a first and a second annular tower section, the structural truss 404 may distribute the loads into both of the first and second annular tower sections.

Figure 5:
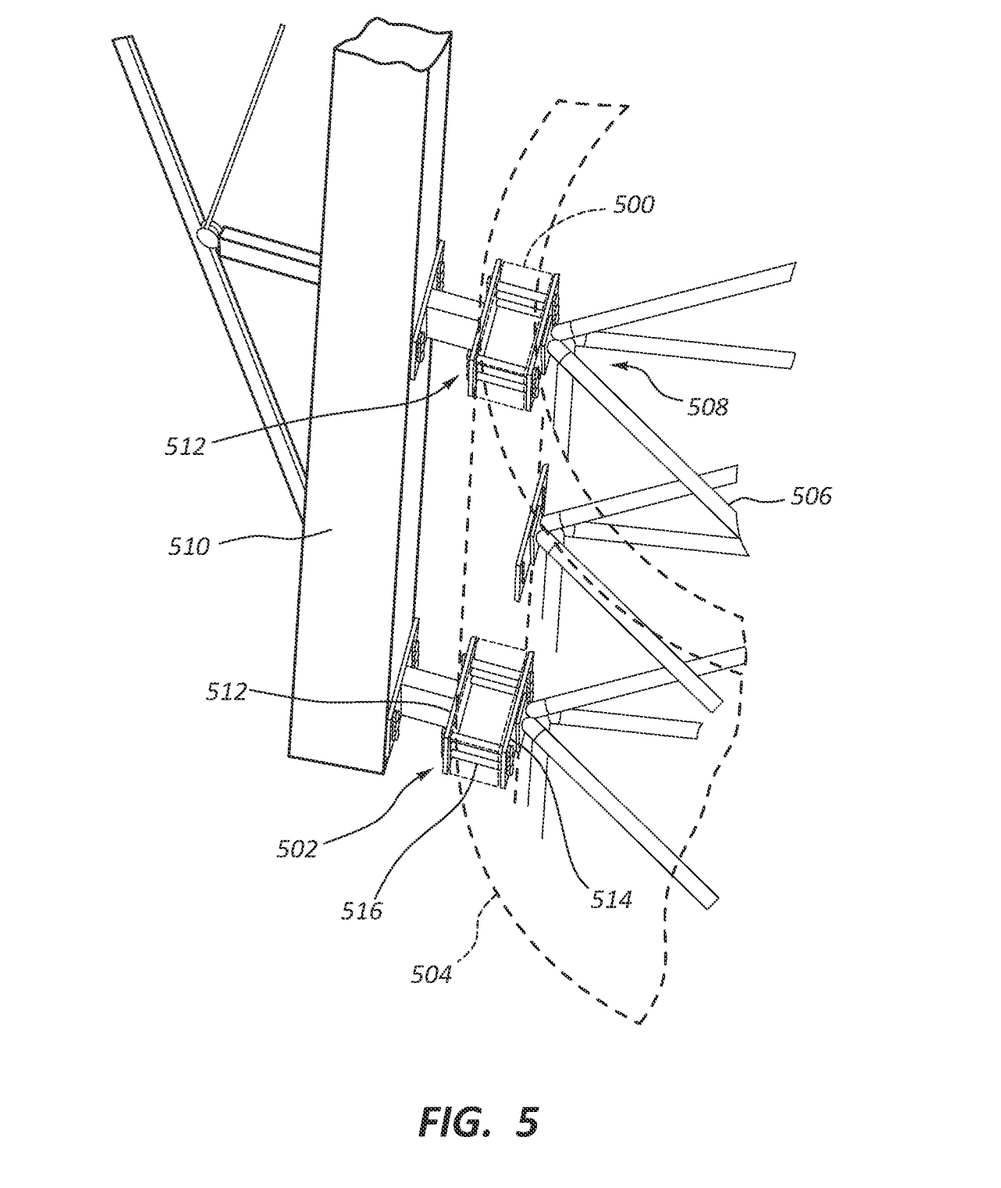
FIG. 5 illustrates a detailed view of an example of connection in accordance with the present disclosure.

FIG. 5 depicts an example of a plate 500 in a lateral opening 502 of an annular tower section 504. In this example, the structural truss 506 is connected to an inner surface 508 of the plate 500, and the mast assembly 510 is connected to the outer surface of the plate 500.

The mast assembly 510 may include a bracket 512 that connects to the plate 500, and the structural truss 506 may also include a bracket 514 that connects to the plate 500. Fasteners 516 may connect the brackets 512, 514 to the plate 500.

Figure 6:
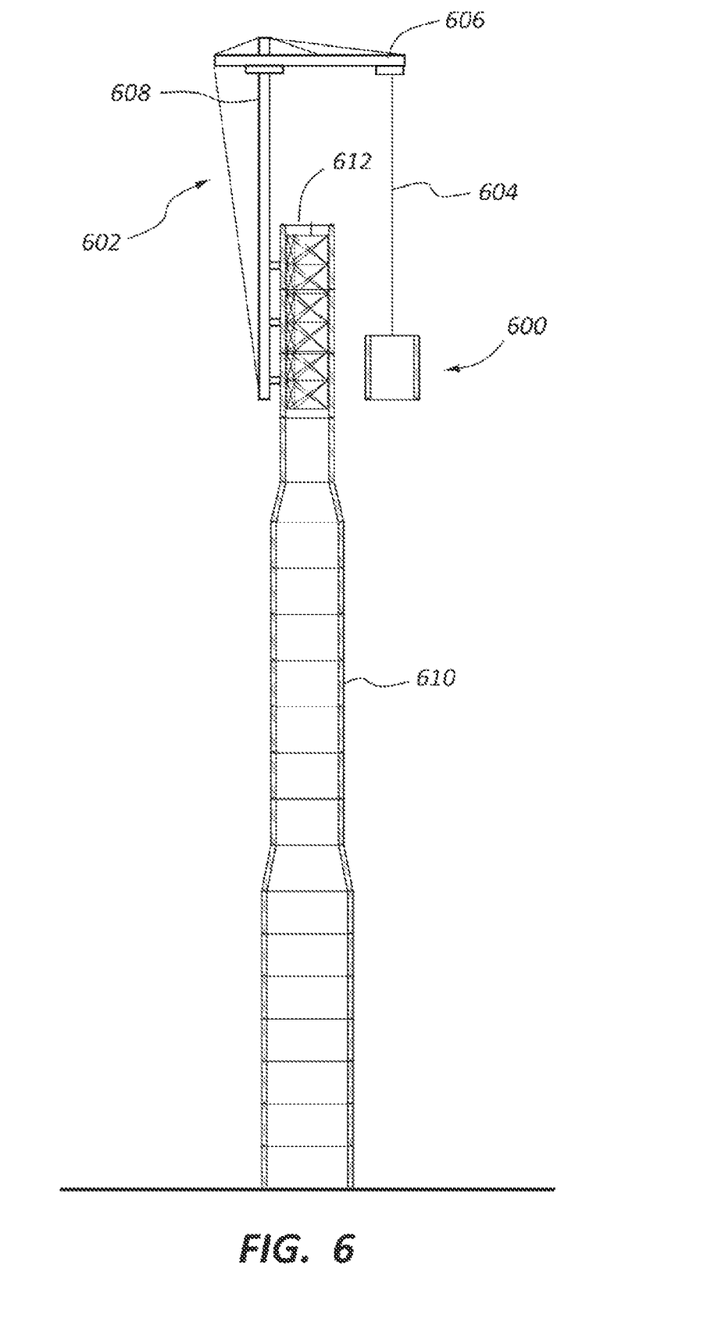
FIG. 6 illustrates a side view of an example of a crane system in accordance with the present disclosure.

FIG. 6 depicts an example of an additional tower section 600 being lifted by the crane system 602. As the crane system 602 lifts the additional tower section 600, the weight from the additional tower section 600 is transferred from the hoisting cable 604 to the jib arm 606, to the crane mast 608, through the plate in the tower's annular wall 610, into the structural truss 612. The structural truss 612 distributes the load into the tower from the inside. Thus, the tower supports the loads involved in hoisting the tower sections 600 for constructing itself.

Figure 7:
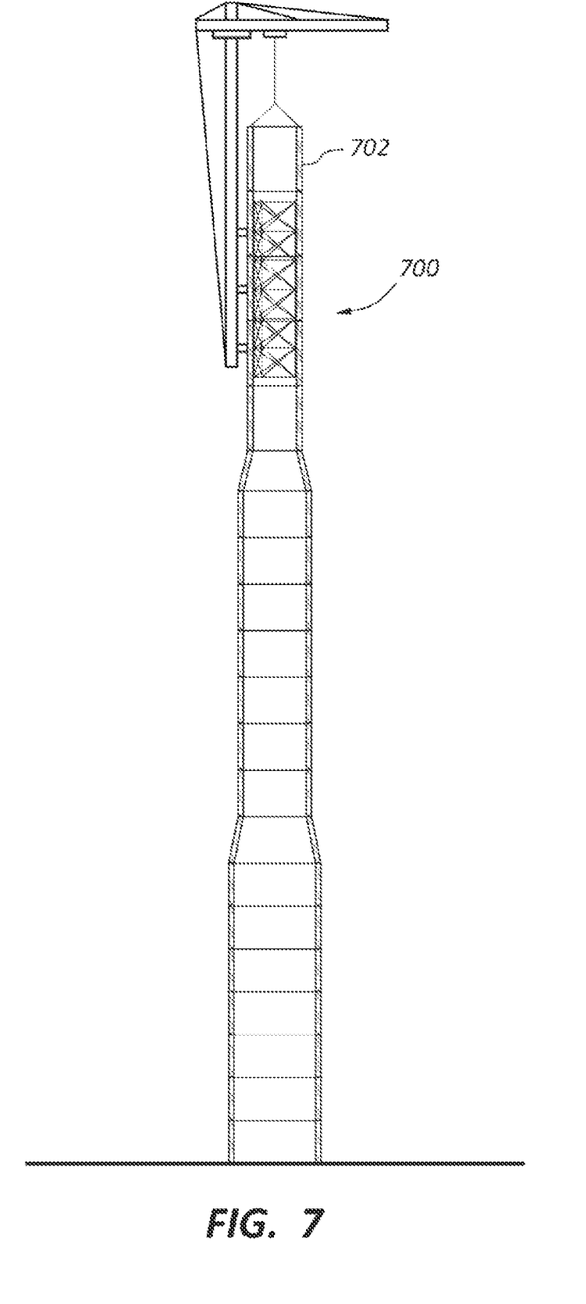
FIG. 7 illustrates a side view of an example of a crane system in accordance with the present disclosure.

FIG. 7 depicts an example of the additional tower section 702 positioned on top of the annular tower 700. The additional tower section 702 may have been placed on the top of the annular tower 700 with the mast assembly 704.

With the additional tower section 702 positioned on the top of the annular tower 700, the additional tower section 702 becomes part of the annular tower 700. The additional annular tower section 702 may be leveled in place. But, any appropriate attachment procedure to join the annular tower section 702 to the annular tower 704 may be used in accordance with the principles described herein.

Figure 8:
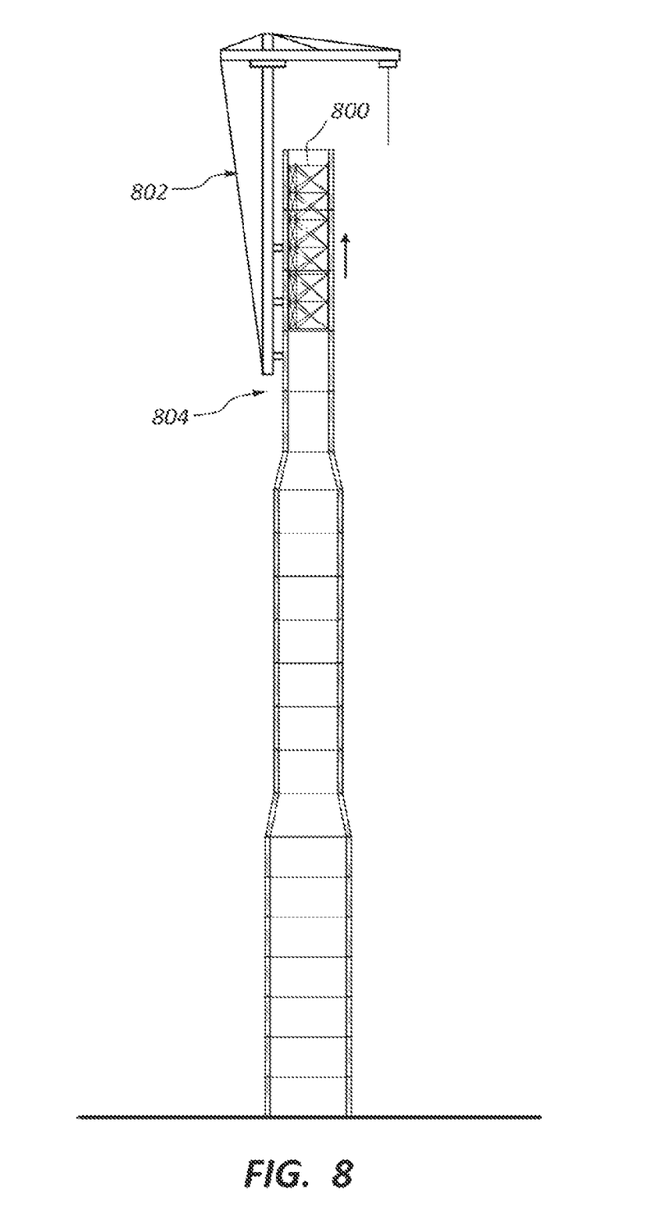
FIG. 8 illustrates a side view of an example of a crane system in accordance with the present disclosure.

FIG. 8 depicts the structural truss 800 and the mast assembly 802 moved to a higher position in the annular tower 804. As more annular tower sections are added to the tower, the higher the tower 804 becomes and the higher that the mast assembly 802 has to rise to place additional tower sections. In some cases, the mast assembly 802 may raise and position just a single tower section before the mast assembly needs to move up to raise and position another annular tower section. But, in other examples, the mast assembly 802 may raise and position multiple single tower sections before the mast assembly needs to move up to raise and position another annular tower section.

Any appropriate mechanism may be used to raise and/or lower the structural truss 800 and the mast assembly 802. In some examples, a platform and/or a ladder may be secured inside of the central opening of the annular tower 804 so that a worker can manually disconnect the structural truss from the inside. A cable and winch system may be used to raise the unfastened structural truss to the new height, where the worker may also manually connect the structural truss 800 to the plate in the lateral opening or to another connection point. In other examples, a hydraulic lift may be used to raise the structural truss 800 to the new height. In some examples, a robotic mechanism or an automatic mechanism may be used to cause the structural truss 800 to disconnect and/or reconnect to the components inside of the central opening. In some examples, the same type of mechanisms that are used to raise and lower the structural truss 800 can be used to raise and lower the mast assembly 802.

The structural truss 800 may be initially assembled inside of the central opening of the annular tower 804. In this example, a door or another type of opening may be located in a bottom section of the annular tower 804. The components of the structural truss 800 may be brought through this door or opening so that the structural truss may be assembled on the inside.

The width of the structural truss 800 allows the structural truss to make contact with inside surface of the central opening. Thus, the principles described herein are well suited for those situations where the central opening has a consistent diameter or cross section. In some cases, the annular tower 804 has a consistent diameter, like the example depicted in FIG. 1. In other case, the annular tower sections may vary. In these cases, the structural truss 800 may be modified for each of the different portions. For example, some of the structural truss beams may be collapsible to a shorter size to accommodate the tower's diameter changes. For example, the truss may elongate when the annular tower 804 is a smaller diameter, where vertical members of the truss must lengthen. In some examples, the beams may telescope, twist, bend, or otherwise shorten as the structural truss 800 moves into a portion of the tower with a smaller diameter. In other examples, some beams may be sized to be removed from the structural truss so that their removal allows for the structural truss to be sized for the smaller tower diameter. In other examples, once the structural truss 800 reaches the diameter change, the structural truss 800 or just a portion of the structural trust 800 is disassembled and a new structural truss 800 with a smaller width is reconstructed for the smaller diameter portion of the tower. While these examples have been described with reference to a structural truss well suited for movement in consistent diameter portions of a tower, the features that make the structural truss adjustable to a shorter width may be applied to structural trusses used in towers with constantly changing diameters, such as towers that have a continuous taper.

Figure 9:
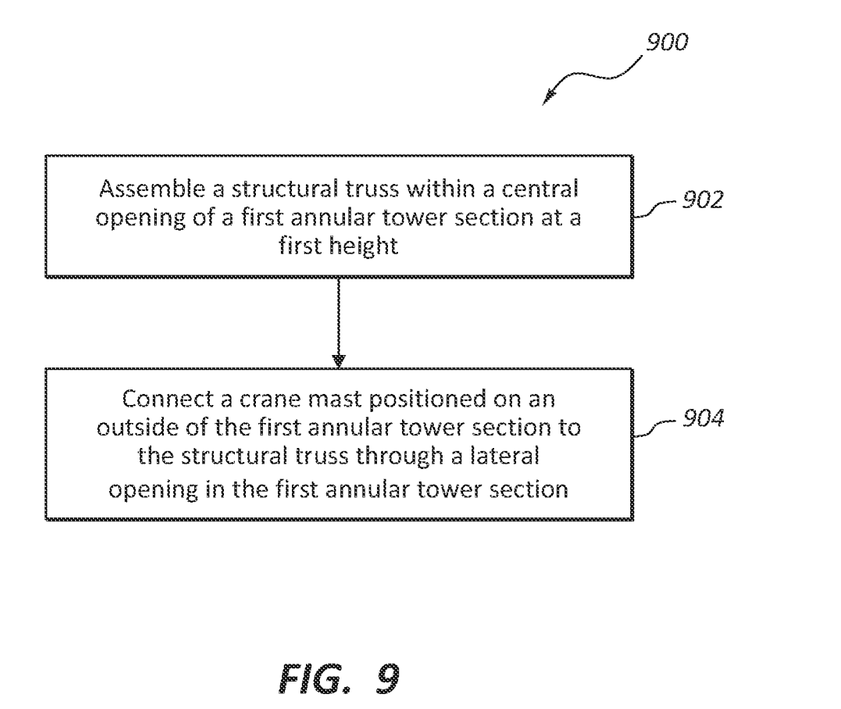
FIG. 9 illustrates an example of a method of erecting a crane in accordance with the present invention.

FIG. 9 depicts an example of a method 900 of erecting an annular tower. In this example, the method 900 includes positioning 902 a structural truss within a central opening of a first annular tower section at a first height and connecting 904 a crane mast positioned on an outside of the first annular tower section to the structural truss through a lateral opening in the first annular tower section.

At block 902, the structural truss is positioned within the central opening of the annular tower. The structural truss may be assembled inside of the central opening. Further, the structural truss may be secured to a plate in a lateral opening or multiple plates in multiple lateral openings in the tower's wall. The width of the structural opening may be wide enough that with the structural truss secured in the central opening, that the sides of the structural truss make contact with the inside surface of the central opening.

At block 904, a crane mast is positioned to the outside of a first annular tower section and connected to the structural truss. The connection between the crane mast and the structural truss allows for the weight of the mast assembly's payload to be transferred into the annular tower. Inside the annular tower, the weight is transferred through the structural truss into the walls of the annular tower. With the payload positioned on just one side of the tower, the payload initially induces an uneven force on the annular tower. But, the connection between the mast assembly and the structural truss, the weight is transferred centrally into the annular tower where the weight can be distributed evenly and gradually throughout the portion of the tower in contact with the structural truss.

Figure 10:
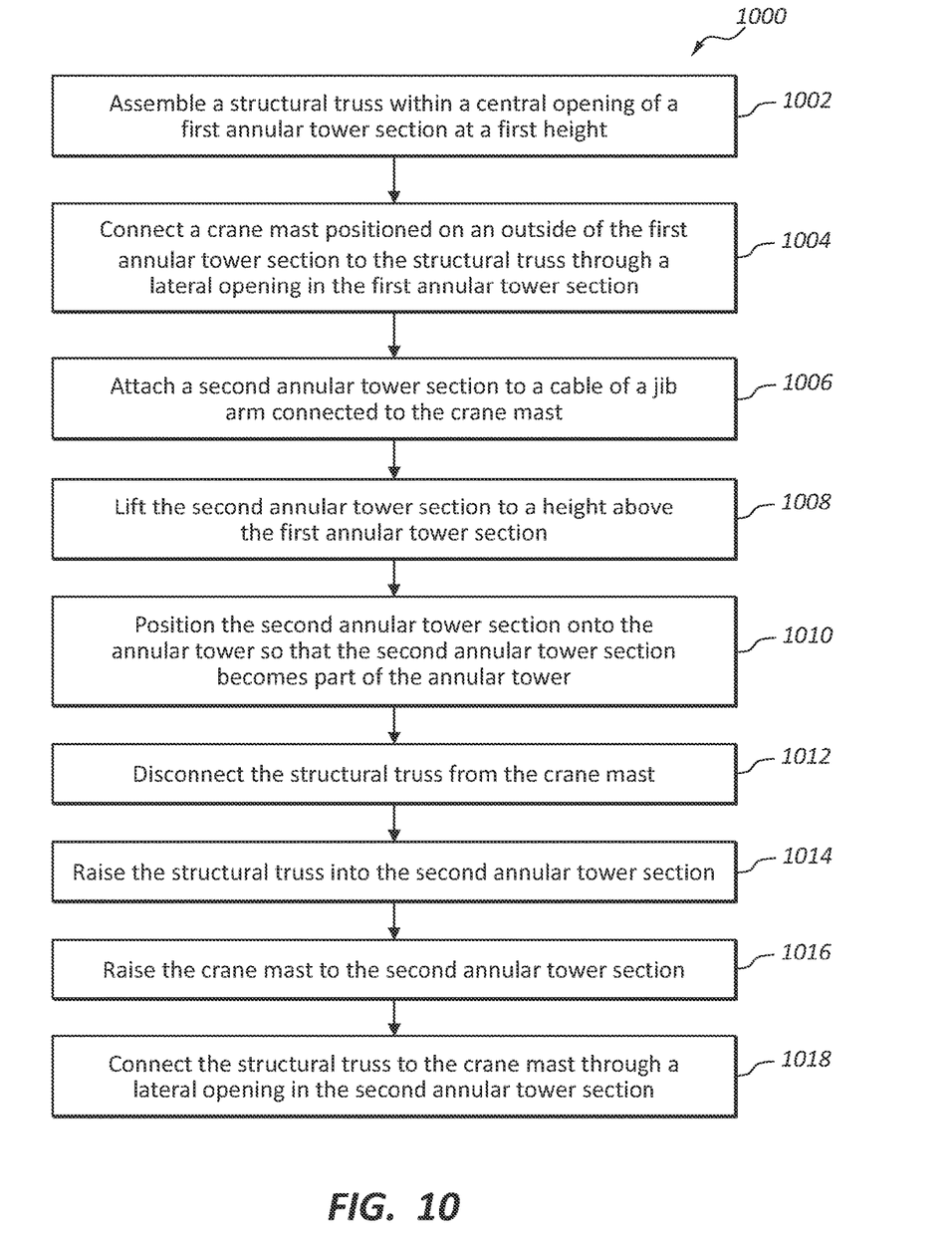
FIG. 10 illustrates an example of a method of erecting a crane in accordance with the present invention.

FIG. 10 depicts an example of a method 1000 of erecting an annular tower. In this example, the method 1000 includes assembling 1002 a structural truss within a central opening of a first annular tower section at a first height, connecting 1004 a crane mast positioned on an outside of the first annular tower section to the structural truss through a lateral opening in the first annular tower section, attaching 1006 a second annular tower section to a cable of a jib arm connected to the crane mast, lifting 1008 the second annular tower section to a height above the first annular tower section, positioning 1010 the second annular tower section onto the annular tower so that the second annular tower section becomes part of the annular tower, disconnecting 1012 the structural truss from the crane mast, raising 1014 the structural truss into the second annular tower section, raising 1016 the crane mast to the second annular tower section, and connecting 1018 the structural truss to the crane mast through a lateral opening in the second annular tower section.

At block 1006, a second annular tower section is connected to a cable of the jib arm of the mast assembly. In some examples, the cable has a hook the connects to another cable secured to the annular tower section. At block 1008, the second annular tower section is lifted to a height above the first annular tower section that is already incorporated into the annular tower. At block 1010, the second annular tower section is positioned onto the annular tower so that the second annular tower section becomes part of the annular tower. With the second annular tower section positioned on the first annular tower section, the second annular tower section can be secured to the first annular tower section. For example, the second annular tower section may be connected to the first annular tower section. As a result, the second annular tower section becomes part of the annular tower.

At blocks 1012, the structural truss is disconnected from the crane mast. Disconnecting the structural truss from the crane mast may be done manually. Or, in other examples, disconnecting the structural truss from the crane mast may be done with a robotic or computerized mechanism. At blocks 1014 and 1016, the structural truss and crane mast are raised to the second annular tower section. Raising the structural truss and the crane mast may be performed with any appropriate mechanism. At block 1018, the structural truss is connected to the crane mast through a lateral opening in the second annular tower section.

Figure 11:
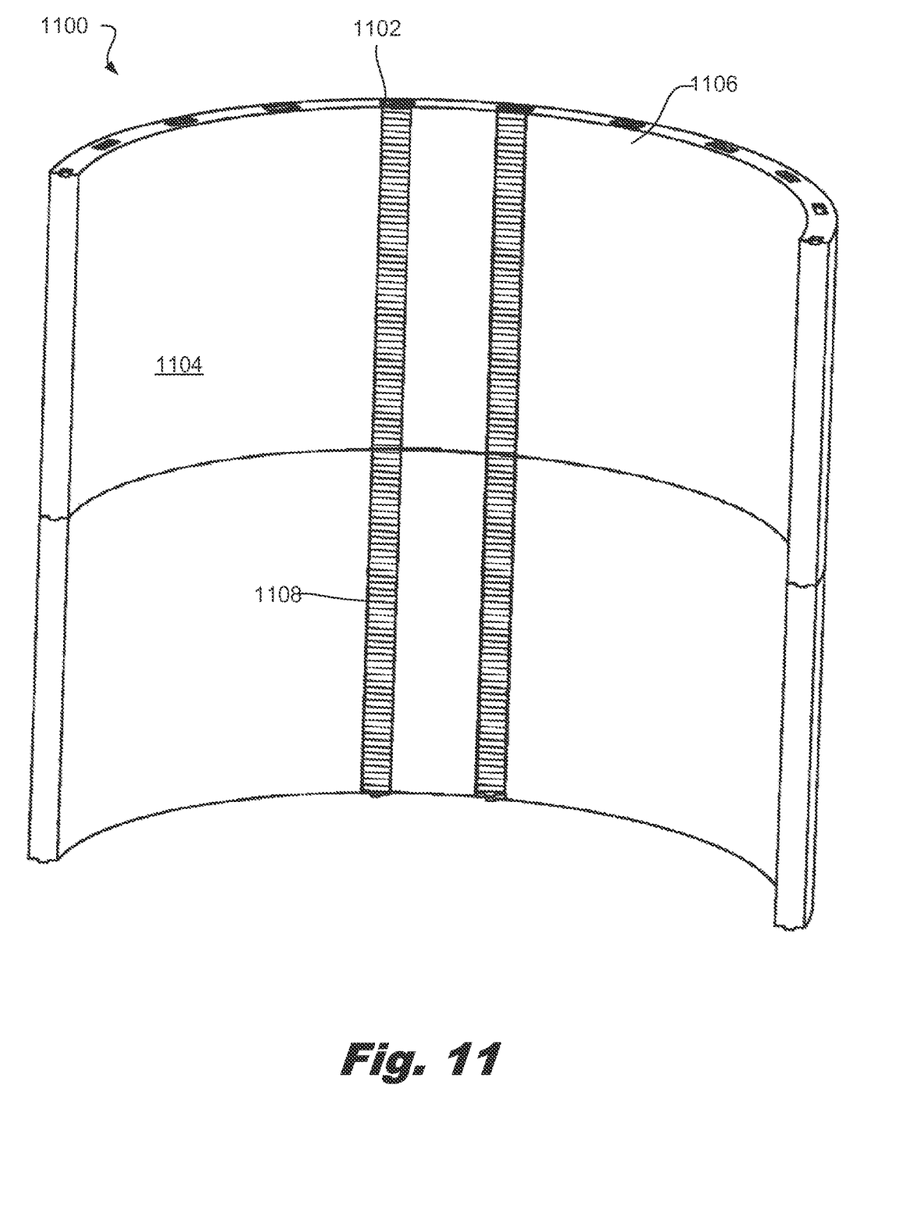
FIG. 11 illustrates an example of a lift mechanism in accordance with the present invention.

FIG. 11 depicts an example of a lift mechanism 1100 for moving the structural truss to different elevations. In this example, the lift mechanism 1100 includes a track 1102 that is incorporated into the inside surface 1104 of the annular tower sections 1106. The track 1102 can guide the structural truss in an upward direction as new annular tower segments are added to the tower.

The tracks 1102 may include a row of teeth 1108 that mesh with a pinion connected to the structural truss. A motor may cause the pinion to rotate in a first direction when it is desirable for the structural truss to move upward within the central opening of the tower. The motor may be remotely controlled by an operator. In other examples, the motor may automatically start in response to a trigger event.

In the illustrated example, the inside surface 1104 is connected to a pair of tracks 1102. In such an example, a pinion may be in communication with each of the tracks 1102. In such an example, the structural truss is supported at multiple locations where the vertical truss members exist. Each pinion may have a dedicated motor. In this example, the load for lifting the structural truss may be distributed between each of the motors and/or tracks. But, in other examples, just a single track 1102 is integrated into the inside surface 1104. In some cases, the structural truss has multiple pinions that are vertically arranged so that the multiple pinions are connected to the same track 1102. Each of the pinions may have a dedicated motor.

The tracks 1102 may be attached to the inside surface 1104 through any appropriate mechanism. For example, the tracks 1102 may be cast into the wall of the annular tower sections 1106. In other examples, the tracks 1102 are connected to the inside surface 1104 after the annular tower section 1106 is cast. In this example, fasteners may be used to connect the tracks 1102 to the inside surface 1104. Track segments may be incorporated into each of the annular tower sections 1106. Thus, as the annular tower sections 1106 are stacked, the track segments can be joined together to form continuous tracks 1102. As the annular tower sections 1106 are brought together, the crane system may rotate and/or orient the annular tower sections 1106 so that the track segments align.

While this example has been described with reference to a track that has teeth for connection with a pinion incorporated into the structural truss, any appropriate type of track may be used in accordance with the principles described herein. For example, the track may include side rails that guide the direction of the structural truss. The guidance may be useful for locating the appropriate joints of the structural truss with the plates in the annular wall to which the structural truss attach so that the loads from the crane mast can be transferred to the structural truss. In another example, a hydraulic piston or a pneumatic piston may be used to move the structural truss. A non-exhaustive list of mechanisms that may be used to move the structural truss and/or the mast assembly include rack and pinion mechanisms, pulley and cable mechanisms, magnetic mechanisms, hydraulic mechanisms, pneumatic mechanisms, other types of mechanisms, or combinations thereof.

When the structural truss is in the desired position, the structural truss may be bolted to the inside surface of the annular tower segments so that there is a connection between the structural truss and the inside surface for distributing the crane system's load throughout the tower. In other examples, the structural truss expands when at the desired height so that there is contact between the joints of the structural truss and the inside surface of the annular tower segments. When the structural truss is to move, the structural truss may be manually unfastened from the inside surface. In other examples, the structural truss may at least partially collapse to minimize friction between the structural truss and the inside surface when the structural truss is moving upward.

Figure 12:
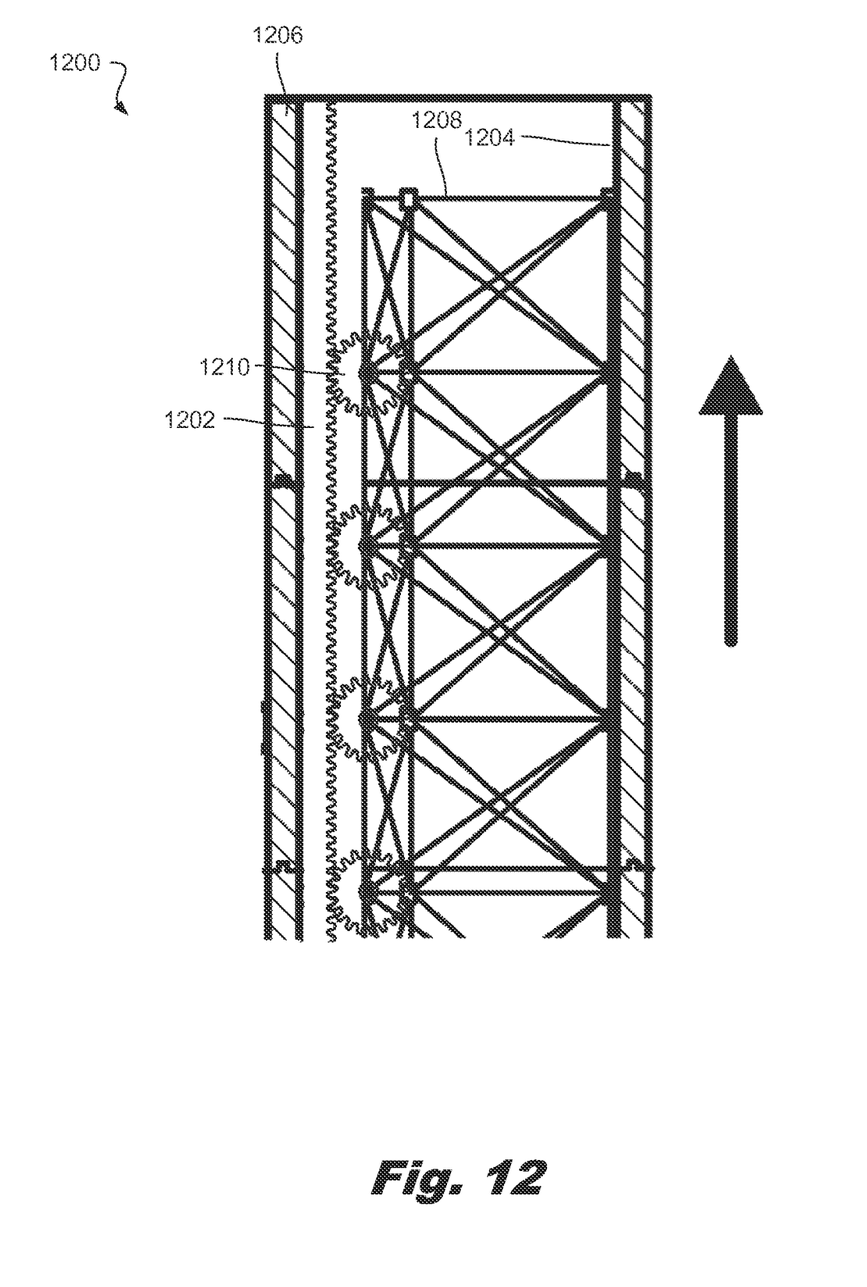
FIG. 12 illustrates an example of a lift mechanism in accordance with the present invention.

FIG. 12 depicts an example of a lift mechanism 1200. In this example, the tracks 1202 are connected to the inside surface 1204 of the annular tower sections 1206. The structural truss 1208 includes multiple pinions 1210 that are connected to the tracks 1202. In this example, the pinions 1210 rotate to move the structural truss 1208 upward in the central opening.

While not shown, the crane mast may also be moved up or down the outside of the tower with a track. Such a track may also include multiple track segments that are connected to each other as the annular tower sections are joined together. But, any appropriate mechanism for moving the crane mast may be used in accordance with the principles described herein.

While the examples depict a specific type of mast assembly, specific type of boom, a specific type of jib arm, and other specific types of crane components, any appropriate type of crane components may be used in accordance with the principles described herein. For example, the jib arm may lift loads horizontally and/or vertically. In some examples, the jib arm can move loads horizontally by rotating about the crane mast. In other examples, the jib arm can move loads horizontally by sliding at least a portion of the jib arm along a track or along a rail or a track that is supported by the jib arm. In yet other examples, the jib arm may move horizontal loads by moving a hoisting mechanism along a track incorporated into the jib arm.

What is claimed is:

1. A method of erecting an annular tower, comprising:
   positioning a structural truss within a central opening of a first annular tower section at a first height, wherein the structural truss has multiple beams that form a lattice with multiple joints that are in contact with an inside surface of the first annular tower section;
   connecting a crane mast positioned on an outside of the first annular tower section to the structural truss through a lateral opening in the first annular tower section; and
   moving the structural truss to a second height within the central opening.

2. The method of claim 1, wherein a jib arm is attached to the crane mast.

3. The method of claim 2, further comprising attaching a second annular tower section to a cable of the jib arm.

4. The method of claim 3, further comprising lifting the second annular tower section to a height above the first annular tower section.

5. The method of claim 4, further comprising positioning the second annular tower section onto the annular tower so that the second annular tower section becomes part of the annular tower.

6. The method of claim 5, further comprising disconnecting the structural truss from the crane mast.

7. The method of claim 6, further comprising raising the structural truss into the second annular tower section.

8. The method of claim 7, further comprising raising the crane mast to the second annular tower section.

9. The method of claim 8, further comprising connecting the structural truss to the crane mast through the lateral opening in the second annular tower section.

10. The method of claim 1, wherein the structural truss further comprises at least two joints in contact with an inside surface of the central opening.

11. The method of claim 10, wherein each of the at least two joints comprises a length that is greater than a cross sectional width of the annular tower.

12. The method of claim 1, wherein a length of the structural truss is over twenty feet long.

* * * * *